Sept. 21, 1937.   W. H. GINDER   2,093,518
TOASTER
Filed June 5, 1936

Inventor
William H. Ginder
by his Attorneys
Houston & Houston

Patented Sept. 21, 1937

2,093,518

UNITED STATES PATENT OFFICE 2,093,518

TOASTER

William H. Ginder, Haddonfield, N. J., assignor to Proctor & Schwartz, Incorporated, Philadelphia, Pa., a corporation of Pennsylvania Application June 5, 1936, Serial No. 83,795

7 Claims. (Cl. 53—5)

This invention relates to bread toasters of the type employing opposed door members which are adapted to hold the bread slices and are manually operable to insert and remove the bread slices and to turn them in order to toast both sides thereof. The principal object of the invention is to provide a novel device of this general character wherein the operation of the door members is greatly facilitated.

Another object of the invention is to provide a novel toaster of this general class, wherein the door members may be operated simultaneously by the actuation of one of them, so that the user of the device may effect actuation of the door members with one hand, leaving the other hand free to insert, remove or change the position of the bread slices.

The invention may be fully understood by reference to the accompanying drawing illustrating a preferred embodiment of the device.

Figure 1:
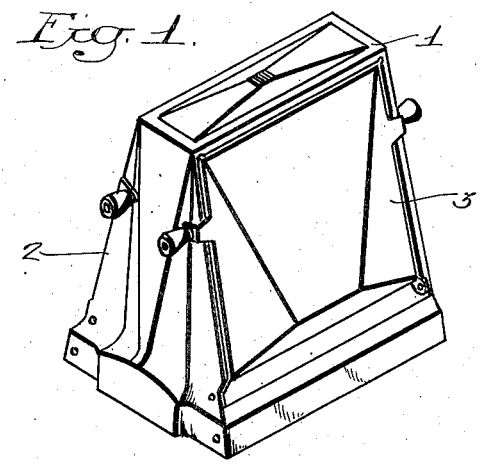
Fig. 1 is a perspective view illustrating a toaster of the type here involved.

Referring first to Fig. 1, there is illustrated a toaster comprising a body 1 and door members 2 and 3 pivotally mounted at their bottom portions to permit them to swing outward as well known in the art. These door members, as is customary, are adapted to serve as supporting members for the bread slices and function to hold the bread slices in cooperative relation with the heating element disposed within the body of the toaster, as well understood. Preferably, the toaster embodies thermostatic control of the general type illustrated in the copending application of Joseph W. Myers and George M. Biddinger, Serial No. 16,514, filed April 15, 1935, although it is to be understood that the present invention is not limited to use in a toaster embodying such control.

As is well known, in the use of toasters of this general class, the door members are moved outward manually to insert, remove or reverse the position of the bread slices. Heretofore, it has been necessary to operate each door separately so that it has required considerable manipulation on the part of the user and this has been a very material objection to toasters of this general class. On the other hand, toasters of this class are simple in construction and are free of parts which are apt to get out of order and, therefore, such toasters have been widely used. In accordance with the present invention, the above-mentioned objection is eliminated by providing a mechanism which causes operation of both of the door members simultaneously when one of them is actuated. Thus, in a single operation, the user may insert, remove or reverse the position of both slices of bread by merely operating one of the door members with one hand and manipulating the bread slices with the other hand.

Figure 2:
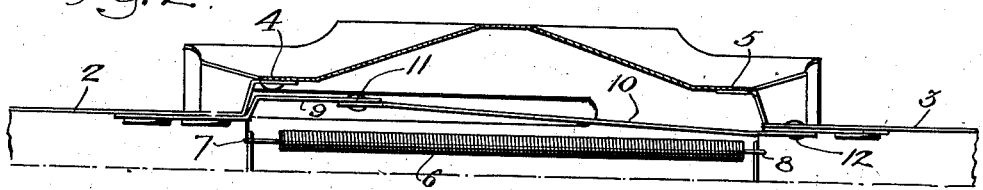
Fig. 2 is a sectional plan view of one end of the toaster showing the mechanism provided by the present invention.
Figure 3:
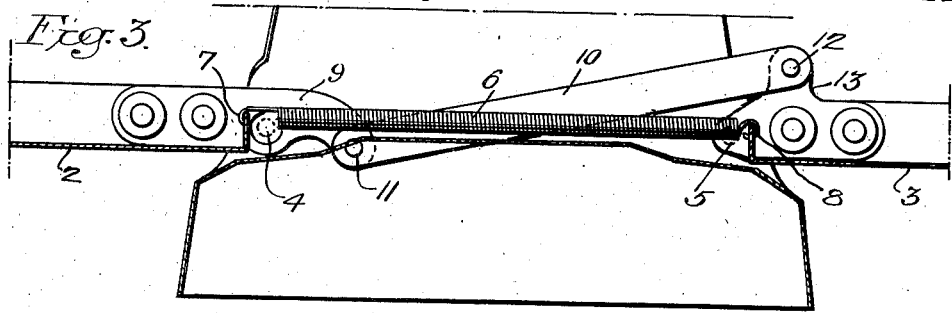
Fig. 3 is a sectional elevation of the same end of the toaster showing the said mechanism more clearly, the door members being in opened position.
Figure 4:
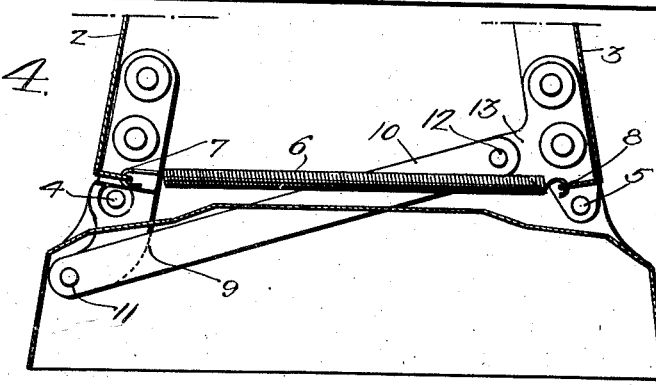
Fig. 4 is a similar view showing the door members in closed position.

Referring now to Figs. 2 to 4, the door members 2 and 3 are pivotally mounted at one end at the points 4 and 5, respectively. A coil spring 6 extends transversely between the door members adjacent the said hinged points thereof and has its ends connected to the bottom flanges of the door members at 7 and 8, the said flanges forming an integral part of the bread-supporting flanges normally provided along the bottom portions of the door members. When the door members are opened, as shown in Figs. 2 and 3, the spring is in "dead center" position with respect to the pivot points 4 and 5 and is unable to close the door members. In such case, the respective weights of the door members maintain them in opened position. When, however, the door members reach a position in their closing movement such that the force of the spring is able to overcome the weights of the door members, the spring causes the door members to close and maintains them in closed position as shown in Fig. 4. This action of the spring assists materially in the manual manipulation of the door members and, in cooperation with the feature now to be described, the spring greatly enhances the operation of the device.

In accordance with the invention, there is provided on door member 2 adjacent the hinge point 4 thereof an extending arm 9 which may take the form of a separate element secured to the side flange of the door member as illustrated. A link 10 has one end pivotally connected at 11 to the end of arm 9 and has its other end pivotally connected at 12 to a lug 13 attached to the door member 3. In operation of the door members, the arm 9 serves as a crank arm with respect to the pivot point 4, and the lug 13 also serves to some extent as a crank arm with respect to the pivot point 5. By means of this interconnection of the door members, they are made to operate simultaneously when one of them is actuated. The base of the toaster is provided with a slot, as illustrated, to accommodate the arm 9 and link 10.

When the door members are in opened position, as shown in Figs. 2 and 3, the mechanical linkage is substantially in "dead center" position and this serves additionally to hold the door members open. When one of the door members is actuated to close it, the other door member is closed simultaneously through the action of the linkage involving crank action as above noted. At a predetermined point in the movement of the door members, the spring 6 is effective to urge the doors to their closed position shown in Fig. 4, as pointed out above.

The spring and interconnecting mechanism, being located at the bottom of the toaster at one end, merely occupy space which is normally wasted and do not interfere with the other elements of the toaster. By virtue of the cooperative functioning of these features, the operation and use of the toaster is greatly facilitated. Thus, the invention obviates the above-noted objection to prior devices of this general class and renders such devices easier to use and less cumbersome.

Although a single preferred embodiment of the invention has been illustrated and described for the purpose of disclosure, it is to be understood that the invention is not thus limited but is capable of various modifications and changes without departing from the inventive concept.

I claim:

1. In a toaster, a pair of opposed door members hingedly mounted at their bottom portions so as to open outward, resilient means urging said door members to closed position, an arm extending from one of said door members, and a pivotal link connected between the other of said door members and the end of said arm, whereby said door members are operable simultaneously by actuation of one of them.

2. In a toaster, a pair of opposed door members hingedly mounted at their bottom portions so as to open outward, a spring connected between the lower portions of said door members and operative throughout a predetermined range of movement of the door members to urge them to closed position, an arm extending from the lower portion of one of said door members, and a pivotal link connected between the lower portion of the other of said door members and the end of said arm, whereby said door members are operable simultaneously by actuation of one of them.

3. In a toaster, a pair of opposed door members hingedly mounted at their bottom portions so as to open outward, a spring connected between the lower portions of said door members adjacent hinge mountings thereof and operative throughout a predetermined range of movement of the door members to urge them to closed position, an arm extending from the lower portion of one of said door members beyond a hinge mounting thereof, and a pivotal link connected between the lower portion of the other of said door members and the end of said arm, whereby said door members are operable simultaneously by actuation of one of them.

4. In a toaster, a pair of opposed door members hingedly mounted at their bottom portions so as to open outward, resilient means urging said door members to closed position, and a mechanical linkage between the lower portions of said door members extending partly above and partly below the hinge mountings of the door members for causing the door members to operate simultaneously when one of them is actuated, said linkage being substantially in dead center position when said door members are in opened position, thus serving together with the weight of the door members to hold the door members open against the action of said resilient means.

5. In a toaster, a pair of opposed door members hingedly mounted at their bottom portions and adapted to open outward to positions substantially at right angles to their closed positions, resilient means urging said door members to closed position, and a link having one end pivotally connected to one of said door members below the hinge mounting thereof, said link having its other end pivotally connected to the other of said door members above the hinge mounting thereof, whereby said door members are operable simultaneously by actuation of one of them.

6. In a toaster, a pair of opposed door members hingedly mounted at their bottom portions so as to open outward, a spring connected between the bottom portions of said door members above their hinge mountings so as to urge said door members to closed position, and a link having one end pivotally connected to one of said door members below the hinge mounting thereof, said link having its other end pivotally connected to the other of said door members above the hinge mounting thereof, whereby said door members are operable simultaneously by actuation of one of them, said spring being substantially in dead center position with respect to said hinge mountings when the door members are in opened position, so that the spring is then ineffective to close the door members but assists said link in the door-closing action.

7. In a toaster, a pair of opposed door members hingedly mounted at their bottom portions so as to open outward, a spring connected between the bottom portions of said door members above their hinge mountings so as to urge said door members to closed position, an arm on one of said door members extending below the hinge mounting thereof, a lateral projection on the other of said door members above the hinge mounting thereof, and a link having its ends pivotally connected to said arm and said projection respectively, whereby said door members are operable simultaneously by actuation of one of them.

WILLIAM H. GINDER.